United States Patent [19]

Haneda et al.

[11] Patent Number: 5,386,310
[45] Date of Patent: Jan. 31, 1995

[54] PARALLEL OPTICAL SWITCHING APPARATUS

[75] Inventors: Makoto Haneda, Takasaki; Yuuichi Ono, Nishitama; Katuaki Chiba, Akikawa, all of Japan

[73] Assignee: Hitachi, Ltd., Tokyo, Japan

[21] Appl. No.: 984,751

[22] Filed: Dec. 3, 1992

[30] Foreign Application Priority Data

Dec. 6, 1991 [JP] Japan .................. 3-322854

[51] Int. Cl.⁶ .................................. G06K 9/74
[52] U.S. Cl. .......................... 365/107; 365/108
[58] Field of Search ......................... 359/107, 108

[56] References Cited

U.S. PATENT DOCUMENTS

| | | | |
|---|---|---|---|
| 5,005,954 | 4/1991 | Liu | 359/107 |
| 5,063,602 | 11/1991 | Peppers et al. | 359/107 X |
| 5,131,055 | 7/1992 | Chao | 359/107 X |

FOREIGN PATENT DOCUMENTS 2-45815 2/1990 Japan .

OTHER PUBLICATIONS

"Optical Implementation of the Hopfield Model", Nabil H. Farhat, Demetri Psaltis, Aluizio Prata, and Eung Paek, Applied Optics, vol. 24, No. 10, May 15, 1985.

"A New Approach to a GaAs/AlGaAs Optical Neurochip with Three Layered Structure", J. Ohta, M. Takahashi, Y. Nitta, S. Tai, K. Mitsunaga, and K. Kyuma, Mitsubishi Electric Corporation, Central Research Laboratory, 1989.

Primary Examiner—Do Hyun Yoo
Attorney, Agent, or Firm—Kenyon & Kenyon

[57] ABSTRACT

A parallel optical switching apparatus wherein at least one m-channel light emission element array and one n-channel light receiving element array are optically connected via an m×n optical conversion element array and the optical conversion element array has an optical amplification function by inductive discharge of input light for each element and performs optical arithmetic or optical conversion in parallel for input light from the light emission element array by the amplification and modulation function.

8 Claims, 3 Drawing Sheets

PARALLEL OPTICAL SWITCHING APPARATUS

BACKGROUND OF THE INVENTION

The present invention relates to a parallel optical switching apparatus which is used as an optical neurocomputing basic element having an optical arithmetic apparatus and learning function for optical computing. The present invention can be used also as a basic device for a subscriber system or an optical transmitter of an optical network.

The arithmetic speed of the prior art of a supercomputer is about 1 Gop/s max. and the parallelism of a very large scale parallel machine which is represented by a connection machine is about $10^4$. An optical computer or neurocomputer has been proposed on the assumption that the arithmetic speed and parallelism will be extended in the future. As a most basic model, an interconnection model is discussed in N. H. Farhat, "Optical Implementation of Hopfield Model", Appl. Opt., Vol. 24, No. 10, pp. 1469–1475.

This model is used to perform arithmetic of multiplication and sum of an input vector $X(n)$ and memory matrix $W(n, m)$ by light and structured so that an output vector $Y(m)$ is obtained by representing the input vector by the optical intensity of an emission element, spreading it in one direction by a cylindrical lens, and modulating the memory matrix (for example, transmission factor) so as to focus in the orthogonal direction. The processing is performed by multiplying the output by a threshold function using this basic structure and feeding back it to the input side. An example that an attempt is made to perform the above processing using a 1-chip structure is discussed in IJCNN, Washington D.C., 1989, Tech. Digest, Vol. II, p. II-477 as an electronic controlled circuit by Ohta and others.

An example that this Hopfield model typed model is applied to an opto-associative memory is reported in Technical Report of The Institute of Electronics, Information and Communication Engineers OQE87-174, p. 39–45, 1988 in detail.

Furthermore, an example that a memory correlative matrix is realized by multiplexing different frequencies or phases for positive and negative values of memory information or the above positive and negative values by alternative time division and by driving them is proposed in Japanese Patent Laid-Open No. 2-45815.

In an optical network system, an art for forming not only the transmission network but also the optical translation network as optical circuits (laser beam) is essential. To realize this optical transmitter, an optical switch is under study and a tree type semiconductor optical switch array is indicated in Report of SWITCH ARRAYS FOR PHOTONIC SWITCHING: STATUS REVIEW AND PROSPECTS (L. Thylen et al, Technical Digest of IEEE Global Telecommunication Conf., San D-iego, Calif. USA, Dec., 1990, Paper 706B.1).

SUMMARY OF THE INVENTION

The memory matrix of an opto-associative memory using the conventional Hopfield model typed interconnection model and the optical mask of the aforementioned electronic controlled circuit use the optical transmission factor and reflection factor. It is difficult to change the transmission factor and reflection factor to programmable factors at a high speed using optical materials and this is a big problem in performing the high speed parallel processing or processing with a learning function.

There is an example that a correlative matrix is modulated to an optical system by performing processing such as frequency multiplexing, phase multiplexing, or time division multiplexing for the positive and negative values of memory information. However, no optical amplification operation is used, so that the positive and negative value processing system for the memory information is complicated and the high speed operation is disturbed due to signal multiplex processing.

An object of the present invention is to provide a parallel optical switching apparatus for allowing each of the optical conversion element parts which is equivalent to each element of the memory matrix or optical mask to be modulated at a high speed and for allowing simple parallel arithmetic.

Furthermore, the conventional interconnection model method uses the optical intensity basically, so that no negative value can be represented and subtraction or comparison cannot be performed.

Another object of the present invention is to provide a method for performing subtraction or comparison and learning directly or in parallel at a high speed.

Furthermore, no consideration is given to the phenomenon that as the parallelism increases in the above prior art using optical free space coupling, the volume of the apparatus increases and to the mounting procedure for a cooling mechanism so as to ensure the stable operation of the elements when various optical parts are mounted.

Another object of the present invention is to provide a mounting procedure that even if the parallelism increases, the volume of the apparatus does not increase so much and the cooling mechanism can be easily mounted.

Another object of the present invention is to provide a structure for allowing the optical conversion elements to operate independently of each other and for high integration and a wiring structure which is not electrically affected by the neighboring elements.

To accomplish the above objects, according to the present invention, optical arithmetic can be performed in parallel at a high speed by forming a semiconductor layer having an optical amplification function by inductive discharge of input light on each element of an optical conversion element array and by controlling the gain of optical amplification for the input light from light emission elements for each element of the optical conversion element array.

Furthermore, according to the present invention, a light emission array and light receiving element array which have a one-to-one correspondence with each element of the optical conversion element array are mounted in layers, and many optical intensity values at every part of the predetermined memory pattern which are inversely converted are stored in an external memory, and they are multiplied and summed programmably by the input pattern and this optical conversion element array. A learning function for identifying the pattern by comparing the deviation of this value to the reference value and for correcting the input information by feeding back this deviation to the input side is provided.

To miniaturize the volume of this parallel optical switching apparatus and allow the cooling mechanism to be easily installed, the light emission element array and light receiving element array are optically connected to an interconnection model on one side of the above optical conversion element array and a reflection mirror is mounted to the substrate of the optical conversion element array.

Furthermore, the parallel optical switching apparatus is structured in a planar mount form so that the outgoing direction of the light emission elements and the incoming direction of the light receiving elements are almost parallel with this optical conversion array surface.

This optical conversion element array has an amplification function perpendicularly to the surface thereof and a cylindrical single layer or active layer with a multiple quantum well (MQW) structure is filled with semi-insulating material or highly resistant semiconductor on the transparent substrate for an input signal and the substrate side of the optical conversion element array is processed as a microlens so as to increase the condensing property.

Furthermore, to ensure electrical wiring for allowing the optical conversion elements to operate independently at a high speed free of effects of neighboring elements, on one or both sides of the optical conversion element substrate, the P and N electrodes of an element can be removed in the orthogonal direction independently of neighboring elements or the P and N electrodes of an element are wired on both sides of the substrate. Furthermore, the optical output signal after optical amplification is supplied to the light receiving unit via a low-loss wave guide independently of other elements.

Each optical conversion element has a function for amplifying an optical signal using the inverted population of the semiconductor optical amplifier, so that the response speed to optical input is very fast such as about tera bits/second. The response speed to a drive current can be made fast like that of a semiconductor laser, such as ten and several giga bits per second in consideration of the stray capacity. On the other hand, the signal delay time of the arithmetic unit from a light emission element to a light receiving element depends on the medium and distance. When the distance between each light emission element and each light receiving element is several cm, the delay time is about 1 nanosecond. Therefore, the processing time can be shortened to such an extent that it depends on the structure and size of the apparatus by modifying the current drive method to the optical amplifier by the optical conversion element. Therefore, compared with the conventional method for changing the transmission factor and reflection factor by optical materials, the gain can be modulated at a higher speed and a gain can be obtained for an optical signal, so that the degree of freedom for arithmetic can be increased.

Since the optical conversion element array having the aforementioned optical amplification function has a gain, a negative value can be obtained by logarithmically converting the gain of each of the optical conversion elements. In other words, negative arithmetic (subtraction) can be performed when the gain is lower than the input value when two logarithmically converted optical conversion element arrays are overlapped in one-to-one correspondence.

When comparing two types of information, for example, the memory information is converted to the amplification gain of each element of the optical conversion element array, and the input information is converted to the optical intensity from the light emission element array, and whether the value which is obtained by multiplying both values reaches the reference value or not can be judged. In the case of an apparatus wherein a light emission element array and light receiving element array which have a one-to-one correspondence with each element of the optical conversion element array are arranged in layers, by storing many optical intensity values at various parts of the predetermined memory pattern which are inversely converted in an external memory and by multiplying and summing them programmably by the input pattern and this optical conversion element array, the total amplification degree of the part which matches the predetermined pattern is 1 and the matching degree can be detected on the basis of the value. Therefore, by selecting a pattern for minimizing the total of deviations, the pattern can be identified and by feeding back this deviation to the input side, the pattern can be corrected. By doing this, a learning function can be provided.

In an optical free space coupling system, light is inputted into or outputted from both sides of the optical conversion element array, so that it is difficult to install a cooling mechanism to this optical conversion element array and as the number of channels of the optical conversion element array increases, the volume of the apparatus increases cubically. However, it is obvious that such problems can be solved by producing a planar mount form for making the outgoing direction of the light emission elements and the incoming direction of the light receiving elements almost parallel with the optical conversion element array, by mounting the light emission element array, light receiving element array, and optical conversion element array in layers in one-to-one correspondence, and by integrating them to a chip.

It is obvious that the integration of the conversion element array can be increased by mounting the optical amplification function unit perpendicularly to the array surface easier than in parallel with the array surface. Simultaneously, the input signal light fetching efficiency can be increased by spreading the opening angle of the input side substrate surface of the optical conversion element array by processing the microlens.

As to electrical crosstalk, a means for spreading the distance between each neighboring conductors or intersecting them orthogonally so as to prevent electromagnetic coupling is well known. When the elements of the optical conversion element substrate are wired so that the P and N electrodes of each element intersect each other orthogonally on both sides of the substrate, the electrical crosstalk can be reduced by half.

DESCRIPTION OF THE PREFERRED EMBODIMENTS

Figure 1:
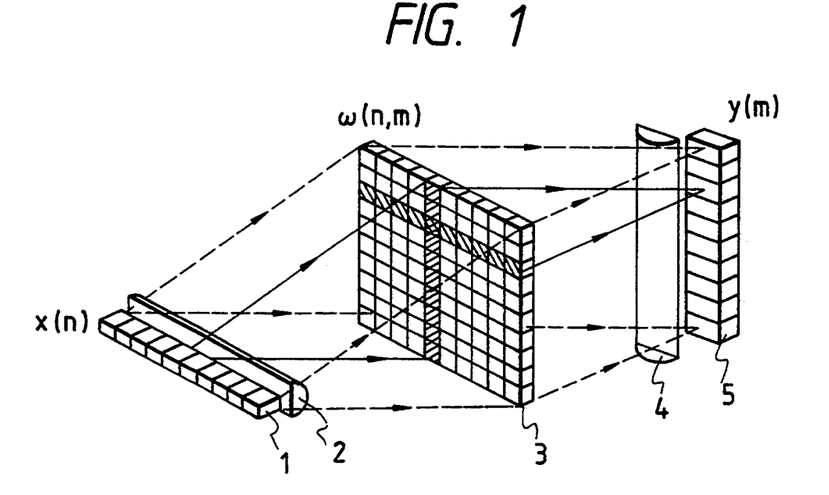
FIG. 1 is a block diagram of a parallel optical switching apparatus indicating an embodiment of the present invention.
Figure 2A:
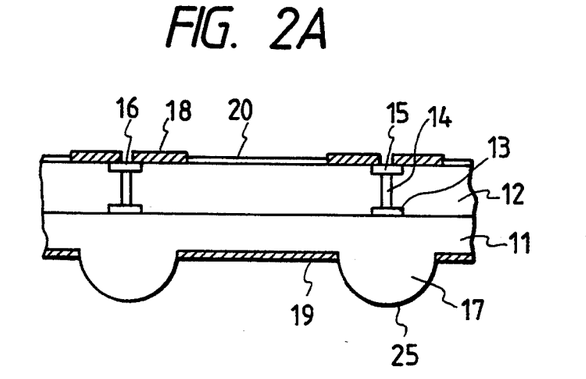
FIG. 2(A) is a sectional view of an optical switching array with surface emitting amplifier indicating an embodiment of the present invention.
Figure 2B:
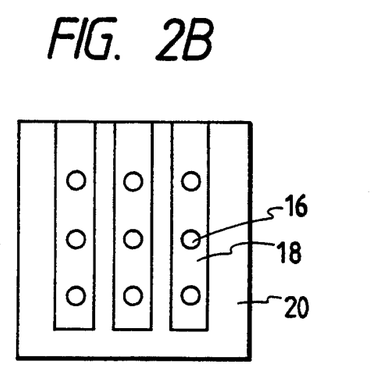
FIG. 2(B) is a surface appearance view.
Figure 2C:
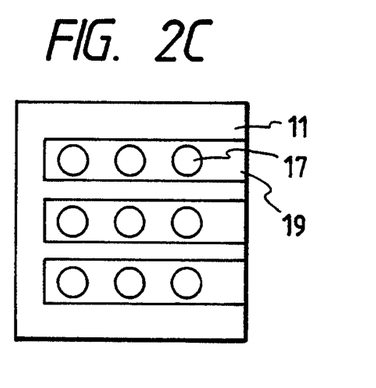
FIG. 2(C) is a rear appearance view.

The first embodiment of the present invention is shown in FIGS. 1 and 2.

FIG. 1 shows an example that the parallel optical switching apparatus is used as an optical arithmetic apparatus or an optical conversion apparatus.

Firstly, an example of the optical arithmetic apparatus for performing arithmetic of multiplication and sum of $y(m)=w(n, m) \cdot x(n)$. Each element of an input vector $x(n)$ is represented by the optical intensity of each element of a light emission element array 1, focused in one direction by a cylindrical lens 2, and inputted into an optical conversion element array 3 which is equivalent to the correlative matrix $w(n, m)$.

Each element of the correlative matrix $w(n, m)$ is represented by the optical amplification degree of each element of the optical conversion element array 3 and multiplied by the input light. The output light is focused by a cylindrical lens 4 perpendicularly to the input light and converted to an electrical output vector $y(m)$ by a light receiving element array 5.

For a case of execution of arithmetic of multiplication and sum of a vector and matrix, for example, an example indicated by the following expression (1) will be considered.

$$\begin{pmatrix} y_1 \\ y_2 \\ y_3 \end{pmatrix} = \begin{pmatrix} 1 & 0 & 2 \\ 1 & 0 & 0 \\ 1 & 1 & 2 \end{pmatrix} \begin{pmatrix} 1 \\ 0 \\ 2 \end{pmatrix} \quad (1)$$

where each element of the light emission element array 1 is emitted at an intensity of $x_1=1$, $x_2=0$, or $x_3=2$, and the optical amplification factor (=optical signal output/optical signal input) of correlative matrixes $w_{11}$, $w_{21}$, $w_{31}$, and $w_{32}$ is 1, and the optical amplification factor of correlative matrixes $w_{12}$, $w_{22}$, and $w_{23}$ is 0, and the optical amplification factor of correlative matrixes $w_{13}$ and $w_{33}$ is 2. The light emitted from each element of the light emission element array at the aforementioned optical intensity is focused by the cylindrical lens 2, distributed evenly to each column of the optical conversion element array 3, and amplified at the aforementioned amplification factor. In other words, processing equivalent to the following matrix arithmetic of multiplication and sum is performed by this apparatus.

$y_1 = w_{11} \cdot x_1 + w_{12} \cdot x_2 + w_{13} \cdot x_3 = 1 \times 1 + 0 \times 0 + 2 \times 2 = 5$ $y_2 = w_{21} \cdot x_1 + w_{22} \cdot x_2 + w_{23} \cdot x_3 = 1 \times 1 + 0 \times 0 + 0 \times 2 = 1$ $y_3 = w_{31} \cdot x_1 + w_{32} \cdot x_2 + w_{33} \cdot x_3 = 1 \times 1 + 1 \times 0 + 2 \times 2 = 5 \quad \ldots (2)$ where a numeral 1 of the elements $y_1$, $y_2$, and $y_3$ of the output vectors indicates intensity of the output from the light emission element array 1 on the optical conversion element array surface, which is a specified value.

Next, an example that negative arithmetic is performed will be described.

It is assumed that the aforementioned light emission element array 1, optical conversion element array 3, and light receiving element array 5 are of a 1-element type and each numeral is a logarithmic value of the optical intensity.

For example, when the light emission output is $-10$ dBm (a value on the input side surface of each optical conversion element) and the amplification factor of each optical conversion element is 4 dB, the optical output is $-6$ dBm. The value may be displayed as an input part of $-10$, a conversion part of $+4$, and an output part of $-6$. This means a calculation of $-10+4=-6$.

In this case, a function of logarithm conversion may be set so that the input part is displayed as $-10$ for the light emission output $-10$ dBm and by setting a function of logarithm conversion also in the conversion part and output part, the above negative arithmetic can be performed.

Next, an example that the parallel optical switching apparatus is used as an optical conversion apparatus will be described.

It is assumed that the elements $x_1, \ldots,$ and $x_n$ of the light emission element array 1 shown in FIG. 1 are wired in n subscribers and the elements $y_1, \ldots,$ and $y_m$ of the light receiving element array 5 are wired in m different subscribers. Here, for example, a case that a subscriber of $x_3$ calls a subscriber of $y_5$ will be considered. Processing that only the element on the 5th column (m=5) on the 3rd row (n=3) at address $w(n, m)$ of the optical conversion element array 3 has an optical amplification degree (18 dB) and the other elements are not amplified ($-30$ dB) can be performed by a current supply method to the optical conversion element array, for example, 100 mA at a gain of 18 dB or 0 mA at $-30$ dB. In other words, communication can be performed from the subscriber of $x_3$ to the subscriber of $y_5$ at a crosstalk value of $-48$ dB. Communication from subscribers of $x_1, \ldots,$ and $x_n$ to optional subscribers of $y_1, \ldots,$ and $y_m$ can be easily performed at a low crosstalk value simultaneously in the same way.

This is an example that communication is optionally performed from n subscribers to m subscribers at a crosstalk value of $-48$ dB. It is obvious that information can be transferred optionally from n systems to m systems simultaneously as general information processing.

Next, the structure and performance of the array elements which are actually used will be described. The light emission element array 1 uses 8 channels of a 1.5 μm band InGaAsP/InP system semiconductor laser and the light receiving element array 5 uses 8 channels of an InGaAs/InP system PIN photodiode.

The optical conversion element array 3 is an optical switching array with surface emitting amplifier shown in FIGS. 2A to 2C. The substrate of the optical switching array with surface emitting amplifier uses a transparent N-InP substrate 11 for a wave length of 1.55 μm. On this substrate, a $1 \times 10^{18}/cm^3$ N type optical guide layer 13 with a thickness of 0.4 μm, an undoped InGaAs active layer 14 with a thickness of 10 μm, and a $7 \times 10^{17}/cm^3$ P type InP clad layer 15 with a thickness of 7 μm are formed as Epi layers by the MOCVD method. Next, the above Epi layers are left by dryetching into a cylindrical form with a diameter of 4 μm at intervals of 250 μm, buried with Fe-doped semi-insulated epitaxial grown layers after the side is lightly etched so as to form a high resistance buried layer 12. In this case, the active layer 14 is lightly etched by meltback and the diameter of the active layer 14 after burying is about 3 μm.

To remove the contact resistance, Zn is diffused on the surface of the P-InP clad layer 15, and Ti/Pt/Au P type electrodes 18 are mounted, and the areas 3 μm in diameter of the electrode part right above the active layer are etched so as to from optical output windows 16. On the back of the clad layer, microlenses 17 with a diameter of 100 μm are formed and N type Au-Ge/-Ni/Au electrodes 19 are formed around the microlenses 17. On the surface of each microlens 17, a narrow band filter 25 is mounted for reduction of spontaneous emission noise. The P electrodes 18 are connected on each row and the N electrodes 19 are connected on each column so as to fetch the wires outside. The electrode lines are formed perpendicularly to each other.

In this embodiment, a 8×8 optical switching array with surface emitting amplifier is used and light is interconnected by the aforementioned 8-channel light emission element array and 8-channel light receiving element array using a cylindrical lens. The input loss is about 17 dB due to free space parallel connection and the gain of the amplification part of the optical conversion element array is about 18 dB. Therefore, a slight amplification is obtained in total.

The arithmetic of matrix multiplication and sum of the vector X(8) of the light emission element array, the optical conversion element matrix W(8×8), and the vector Y(8) of the light receiving element array can be performed within about 10 ns. The processing time is faster by at least about 3 digits than the conventional processing time using a liquid crystal. Furthermore, an input signal can be optically changed from the address of the light emission element array to the address of the light receiving element array and the processing time is about 10 ns.

Figure 3A:
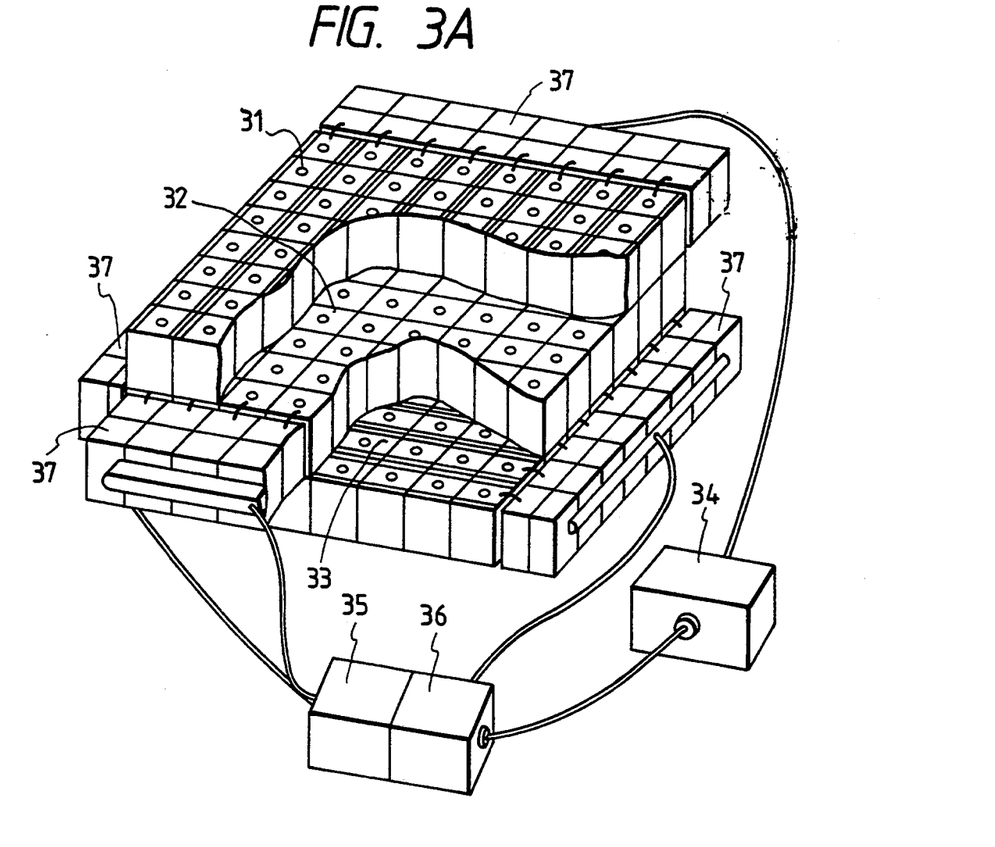
FIG. 3(A) and 3(B) are a block diagram of a learning type optical switching array with surface emitting amplifier circuit indicating an embodiment of the present invention.

Next, an example that a pattern is identified and learned is shown in FIG. 3A as a second embodiment. An optical conversion element array 32 is the same as that shown in FIGS. 2A, 2B and 2C and a surface emitting element array 31 and a surface receiving element array 33 are mounted in layers so that they have a one-to-one correspondence with each element of the 8×8 optical conversion element array 32.

The surface emitting element array 31 is formed by a 1.5 μm InGaAsP/InP system surface emission laser and the surface receiving element array 33 is formed by an InGaAs/InP system PIN type photodiode. The layers are electrically isolated by insulating sheets one by one and adhered to each other with adhesive.

Figure 3B:
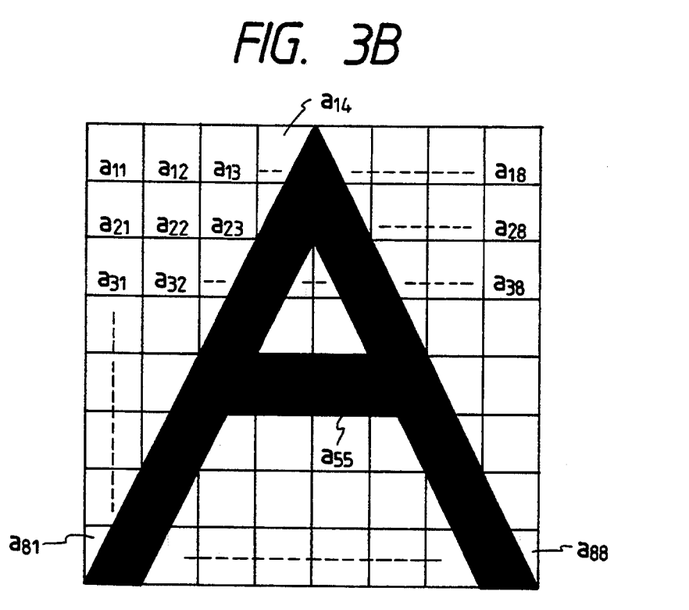

An optional pattern is divided into 8×8=64 parts. For example, the A pattern shown in FIG. 3B is divided into addresses $a_{11}$, . . . , and $a_{88}$. The light reflection value at each address is expressed on the basis of presence or absence of the pattern. For example, when address $a_{11}$ is set to 100 and $a_{55}$ is set to 0, $a_{14}$ is 75 and $a_{81}$ is 25.

The current of each element of the surface emitting laser element array 31 corresponding to the addresses $a_{11}$, . . . , and $a_{88}$ is adjusted so that the optical intensity is proportional to this light reflection value and stored in a drive electronic circuit 34 shown in FIG. 3A. A numeral 37 indicates a wire fetching connector and 64 wires of 8 P electrodes and 8 N electrodes are connected to the drive electronic circuit 34. The same may be said with the other wire connectors. A series of these operations (using light receiving sensors corresponding to the addresses $a_{11}$, . . . , and $a_{88}$, the light receiving sensitivity current for the light reflection value from each address is doubled and replaced with a drive current) can be automatically performed.

On the other hand, in the surface emitting amplifier optical conversion element array 32, the reflection value at each address is also converted to the optical intensity equivalent to the light reflection value for a particular pattern, and the drive current is adjusted so as to obtain the amplification factor when the optical intensity is inversely converted and stored in a memory pattern memory 35 via the wire fetching connector 37 as shown in FIG. 3A. The amplification factor of each element of the surface emitting amplifier optical conversion element array 32 is adjusted so that it is, for example, 1/10 for an optical intensity of 10 or 2 for an optical intensity of 0.5.

Next, the light output from the surface emitting laser array 31 which is equivalent to an optional input pattern and the surface emitting amplifier optical conversion element array 32 having a predetermined amplification factor for a particular pattern are multiplied in one-to-one correspondence, that is, the light output from the surface emitting laser array 31 is inputted into the surface emitting amplifier optical conversion element array 32 and the output is detected by the surface receiving element array 33. In this case, a pattern wherein the deviation at each address is smallest when the output is 1 (same value as standardized output 1 from the surface emitting laser array 31) can be identified as a pattern equivalent to the particular stored pattern. This is because the output at each address is not 1 when the particular pattern is inputted since the surface emitting amplifier optical conversion element array 32 has the amplification factor of the reciprocal of the optical intensity of the particular pattern.

This output is compared with the sum of the square of the deviation at each address by a comparison control computer 36. The identification time required for one pattern comparison is very short such as 100 ns.

Next, an example that a pattern is learned will be described.

It is assumed that the contents which are stored in the memory pattern memory 35 as information of a particular pattern are incorrect and the memory pattern memory is corrected for an external correct input pattern.

Firstly, as mentioned above, the stored particular pattern and input pattern are multiplied using the surface emitting amplifier optical conversion element array 32 and the surface emitting laser array 31 and detected by the surface receiving element array 33. In this case, the deviation for output 1 is compared by the comparison control computer 36 and the amplification gain at each address of the surface emitting amplifier optical conversion element array 32 is adjusted as a correction equivalent to the deviation value. In other words, the contents of the memory pattern memory 35 are changed so that the output at every address after the output from the surface emitting laser array 31 which is equivalent to the input pattern and the surface emitting amplifier optical conversion element array 32 are multiplied is 1.

In this case, the memory pattern memory 35 can save the information before changing. Therefore, memory hierarchies can be formed from old memory to new memory. In other words, when the external input pattern is changed to a new pattern, the number of memory hierarchies of the memory pattern memory increases and for an old input pattern, the order of oldness of the input pattern can be displayed by identifying the memory hierarchy. The learning time for an input pattern by the above operation is about 100 ns and the time for identifying that an old input pattern is learned is about 1 ms (when the number of memory hierarchies is about 100).

Figure 4:
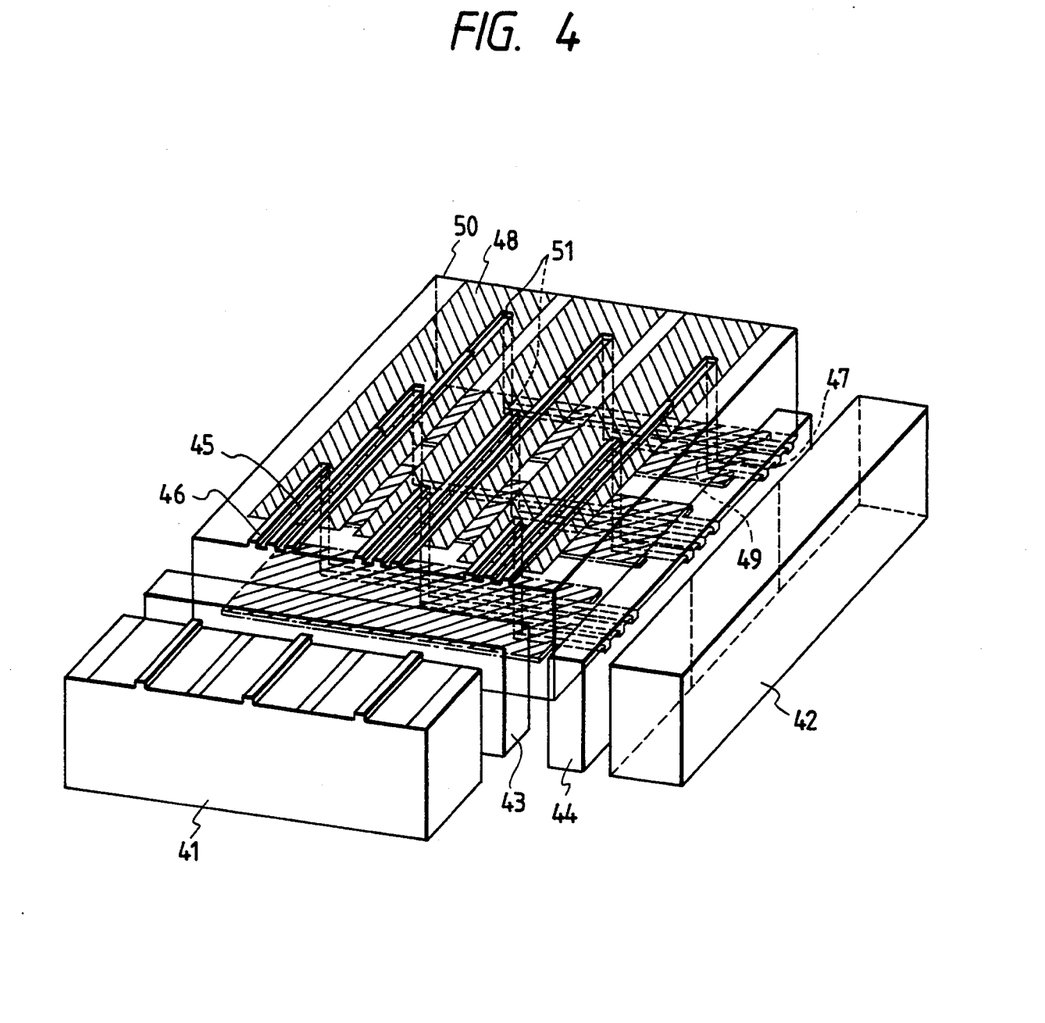
FIG. 4 is an interconnection mounting block diagram of stripe amplification type optical conversion elements indicating an embodiment of the present invention.

Next, an example that optical arithmetic and optical conversion are performed by the surface mounting method as a third embodiment is shown in FIG. 4.

The optical arithmetic and optical conversion methods are the same as those described in the first embodiment.

To allow surface mounting, a wave guide type optical conversion element array 50 is used for optical conversion elements and a light emission element array 41, light receiving element array 42, and microlens arrays 43 and 44 are mounted on the surface.

An active layer 45 for amplifying light of the wave guide type optical conversion element array 50 is formed under a P side electrode 48 and input and output wave guides are formed on the surface and back of the substrate. The input wave guide 46 is connected to the active layer 45 and connected to the output wave guide 47 via a wave guide end mirror 51.

This apparatus performs 3×3 optical arithmetic or optical conversion and has three input wave guides 46, active layers 45, and output wave guides 47 for three input signals from the light emission element array 41, and the light emission element array 41 is connected to the light receiving element array 42.

The light emission element array 41 is mounted at an interval of 250 μm of light emission parts in the junction up state and the light receiving element array 42 is also mounted in a surface incident structure at an interval of 250 μm of light receiving parts. The receiving light diameter is 80 μm. The three input wave guides 46 of the wave guide type optical conversion element array 50 are arranged in correspondence to the light diameter at a pitch of 250 μm. Each distance between the three input wave guides is 7 μm.

The optical output from the light emission element array 41 is converted to a collimated light beam with a diameter of 50 μm by the microlens array 43, so that a similar quantity of light is inputted to the three neighboring input wave guides 46.

The output light from the output wave guide 47 is converted to a collimated light beam by the microlens array 44. Since the three neighboring output wave guides are arranged at a pitch of 7 μm, the beam diameter is 64 μm (50 μm+7 μm×2).

Next, the creation method for the wave guide type optical conversion element array 50 will be described.

The active layer 45, input wave guide 46, and output wave guide 47 for performing optical amplification are formed in the BH type buried structure. In the first crystal growth, on the n-InP substrate, five layers of an n⁻-InGaAsP (λg=1.15 μm) guide layer, n+-InP stop etching layer, n⁻-InGaAsP (λg=1.3 μm) active layer, p+-InP clad layer, and p+-InGaAsP (λg=1.3 μm) cap layer are grown by the MOCVD method. The optical amplification part area is masked with an oxide film and the other area is removed up to the n+-InP stop etching layer by etching. In the second Epi growth, three layers of an n⁻-InGaAsP (λg=1.15 μm) guide layer, n⁻-InP clad layer, and n⁻-InGaAsP (λg=1.15 μm) cap layer are grown by the MOCVD method. Next, the n⁻-InGaAsP (λg=1.3 μm) active layer with a thickness of 0.15 μm in the first growth and the n⁻-InGaAsP (λg=1.15 μm) guide layer with a thickness of 0.2 μm in the second growth are connected and the connection to the optical amplification active layer 45 from the input wave guide 46 is completed. Next, a p+ contact layer is formed on the optical amplification part by Zn diffusion using the oxide film as a mask. Finally, an input wave guide pattern is formed, and a ridge is formed by the RIE, and a P electrode 48 is formed by passivation. The output wave guide 47 on the back of the N-InP substrate is formed in the same way. When the N-InP substrate is thinned to 50 μm, 1.3 μm light is amplified by the optical amplification activator layer 45 on the surface of the substrate and the optical signal is refracted at 90° by the wave guide end mirror 51 with an inclination of 45° and reaches the output wave guide 47. Another wave guide end mirror 51 is also formed at the end face of the output wave guide 47 at an inclination of 45° and an N electrode 49 is formed on the back of the N-InP substrate.

Since the P electrodes 48 are formed separately from each other for each optical amplification activator layer 45, an optional amplification factor can be specified for light inputted from the light emission element array 41 for each activator layer and vector arithmetic of multiplication and sum and optical conversion can be performed in the same way as with the first embodiment. The feature of this embodiment is that an extremely small size such as 1×1×0.1 mm (thickness) can be realized for 3×3 optical arithmetic and optical conversion. Therefore, 3×3 vector arithmetic of multiplication and sum can be performed in a short time such as 30 ns and optical conversion such as about 10 ns.

According to the present invention, parallel vector and matrix arithmetic and parallel information processing can be performed at high speed. For example, matrix arithmetic of several digits can be performed in several nanoseconds and even if the parallelism is increased, the speed will not slow down so much. When the apparatus is used as an optical switch of an optical converter, optical conversion can be performed between several nanoseconds and several tens nanoseconds with the parallelism increased. Furthermore, according to the present invention, a pattern can be identified, corrected, and learned in an extremely short time such as 1 μs to 1 ms.

What is claimed is:

1. A parallel optical switching apparatus wherein in a system where at least one m-channel light emission element array and one n-channel light receiving element array are optically connected via an m×n optical conversion element array, the optical conversion element array has an optical amplification function and a modulation function by inductive discharge of input light for each element of the optical conversion element array and performs optical arithmetic or optical conversion in parallel for input light from the light emission element array by the amplification and modulation function, wherein said optical conversion element array has a substrate and a reflection mirror on the substrate, and the light emission element array and light receiving element array are interconnected into an optical free space coupling system on one side of the optical conversion element array, and a layer with an optical amplification function or an active layer with an MQW structure and light input and output wave guides are mounted on one side or both sides of the substrate in parallel with a surface of the substrate.

2. A parallel optical switching apparatus according to claim 1, wherein said optical conversion element array has a lamination structure such that said optical conversion element array has a one-to-one correspondence with an m×n surface emitting element array and a surface receiving element array, and wherein an input pattern is input into the optical conversion element array via the surface emitting element array, and optical intensity values at every part of a predetermined memory pattern, which are inversely converted, are input into said optical conversion element array and multiplied and compared programmably, and a feedback arrangement from an output allows an input pattern to be identified, corrected, and learned.

3. A parallel optical switching apparatus according to claim 1, wherein said optical conversion element array has a structure that N and P electrodes of each of m×n elements are electrically separated on one side or both sides of the substrate, parasitic capacitance is reduced and electrodes are led to a periphery of the optical conversion element array.

4. A parallel optical switching apparatus according to claim 1, wherein said light emission element array, said light receiving element array, and said optical conversion element array are formed on the same substrate or integrated and mounted in layers on a single chip.

5. A parallel optical switching apparatus wherein in a system where at least one m-channel light emission element array and one n-channel light receiving element array are optically connected via an m×n optical conversion element array, the optical conversion element array has an optical amplification function and a modulation function by inductive discharge of input light for each element of the optical conversion element array and performs optical arithmetic or optical conversion in parallel for input light from the light emission element array by the amplification and modulation function, wherein said optical conversion element array has a transparent substrate for the wave length of an input signal, active layers, which have a double hetero structure, multiquantum well structure, or distorted quantum well structure, having an optical amplification function at least perpendicularly to the substrate, microlenses or domed layers which increase a numerical aperture of input light and filters for reducing spontaneous emission noise on a surface of each of the microlenses or domed layers.

6. A parallel optical switching apparatus according to claim 5, wherein said optical conversion element array has a lamination structure such that said optical conversion element array has a one-to-one correspondence with an m×n surface emitting element array and a surface receiving element array, and wherein an input pattern is input into the optical conversion element array via the surface emitting element array, and optical intensity values at every part of a predetermined memory pattern, which are inversely converted, are input into said optical conversion element array and multiplied and compared programmably, and a feedback arrangement from an output allows an input pattern to be identified, corrected, and learned.

7. A parallel optical switching apparatus according to claim 5, wherein said optical conversion element array has a structure that N and P electrodes of each of m×n elements are electrically separated on one side or both sides of the substrate, parasitic capacitance is reduced and electrodes are led to a periphery of the optical conversion element array.

8. A parallel optical switching apparatus according to claim 5, wherein said light emission element array, said light receiving element array, and said optical conversion element array are formed on the same substrate or integrated and mounted in layers on a single chip.

* * * * *

UNITED STATES PATENT AND TRADEMARK OFFICE
CERTIFICATE OF CORRECTION

PATENT NO. : 5,386,310
DATED : January 31, 1995
INVENTOR(S) : Makoto Haneda, et al.

It is certified that error appears in the above-indentified patent and that said Letters Patent is hereby corrected as shown below:

| Column | Line | |
|--------|------|---|
| 1 | 32 | Change "that" to --in which--. |
| 1 | 37 | Change "that" to --in which--; change "typed" to --type--. |
| 1 | 57 | Change "D-iego," to --Diego,--. |
| 1 | 62 | Change "typed" to --type--. |
| 2 | 3 | Change "that" to --in which--. |
| 5 | 9 | Change "that" to --in which--. |
| 5 | 64 | Change "that" to --in which--. |
| 6 | 64 | Change "epitaxial" to --epitaxially--. |
| 7 | 5 | Change "from" to --form--. |
| 7 | 36 | Change "that" to --in which--. |

UNITED STATES PATENT AND TRADEMARK OFFICE
CERTIFICATE OF CORRECTION

PATENT NO. : 5,386,310
DATED : January 31, 1995
INVENTOR(S) : Makoto Haneda, et al.

It is certified that error appears in the above-indentified patent and that said Letters Patent is hereby corrected as shown below:

| Column | Line | |
|---|---|---|
| 7 | 5 | Change "from" to --form--. |
| 7 | 36 | Change "that" to --in which--. |
| 8 | 17 | Change "optional" to --optical--. |

Signed and Sealed this

Ninth Day of May, 1995

Attest:

BRUCE LEHMAN

*Attesting Officer*  *Commissioner of Patents and Trademarks*